US011125243B2

(12) United States Patent
Colson et al.

(10) Patent No.: US 11,125,243 B2
(45) Date of Patent: Sep. 21, 2021

(54) TWO-WHEEL AIR CYCLE MACHINE

(71) Applicant: Hamilton Sundstrand Corporation, Charlotte, NC (US)

(72) Inventors: Darryl A. Colson, West Suffield, CT (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 113 days.

(21) Appl. No.: 16/732,754

(22) Filed: Jan. 2, 2020

(65) Prior Publication Data
US 2021/0207613 A1  Jul. 8, 2021

(51) Int. Cl.
*F04D 29/057* (2006.01)
*F04D 17/10* (2006.01)
*F04D 29/08* (2006.01)

(52) U.S. Cl.
CPC ......... *F04D 29/057* (2013.01); *F04D 17/105* (2013.01); *F04D 29/083* (2013.01); *F05B 2240/53* (2013.01); *F05B 2240/57* (2013.01)

(58) Field of Classification Search
CPC ...... F04D 17/10; F04D 29/083; F04D 29/057; F04D 29/26; F04D 29/284; F04D 27/009; F04D 27/023; F02C 7/18; F02C 7/185
See application file for complete search history.

(56) References Cited

U.S. PATENT DOCUMENTS

| | | | | |
|---|---|---|---|---|
| 5,113,670 A | * | 5/1992 | McAuliffe | F16C 17/26 62/402 |
| 6,811,315 B2 | * | 11/2004 | Fournier | F16C 17/042 384/105 |
| 8,347,647 B2 | * | 1/2013 | McAuliffe | F25B 9/004 62/401 |
| 8,734,017 B1 | | 5/2014 | Colson et al. | |
| 9,103,568 B2 | | 8/2015 | Beers et al. | |

(Continued)

FOREIGN PATENT DOCUMENTS

EP   1375730 A1   9/2020

OTHER PUBLICATIONS

Extended European Search Report for EP Application No. 20218003.0, dated May 14, 2021, 8 pages.

*Primary Examiner* — Christopher Verdier
*Assistant Examiner* — Jackson N Gillenwaters
(74) *Attorney, Agent, or Firm* — Kinney & Lange, P.A.

(57) ABSTRACT

A two-wheel air cycle machine includes a tie rod defining an axis, a turbine mounted on the tie rod, and a compressor mounted on the tie rod and having a rotor portion and a disk portion with at least one aperture. The air cycle machine further includes a compressor inlet fluidly connecting the compressor and an inlet air source, at least one thrust bearing disposed between the turbine and the compressor, and a compressor end shaft coaxial with the tie rod and abutting the compressor disk portion. The compressor end shaft includes a radially-extending seal disk portion and an axially-extending shaft portion having at least one shaft aperture. The at least one disk aperture and the at least one shaft aperture are fluidly connected by a compressor disk cavity defined by a gap between the tie rod and the compressor disk portion. The at least one disk aperture, the compressor disk cavity, and the at least one shaft aperture at least partially define a compressor inlet flow path.

20 Claims, 3 Drawing Sheets

(56) References Cited

U.S. PATENT DOCUMENTS

| | | |
|---|---|---|
| 9,611,784 B2 | 4/2017 | Beers et al. |
| 10,160,546 B2 | 12/2018 | Beers et al. |
| 2012/0156065 A1* | 6/2012 | Colson .................... F16L 9/006 417/405 |
| 2013/0224016 A1* | 8/2013 | Beers .................... F04D 29/584 415/229 |
| 2015/0233386 A1 | 8/2015 | Beers et al. |
| 2016/0215790 A1* | 7/2016 | Beers .................... F04D 29/441 |
| 2017/0321722 A1 | 11/2017 | Chrabascz et al. |
| 2021/0033111 A1* | 2/2021 | Merritt .................... F04D 17/10 |

* cited by examiner

TWO-WHEEL AIR CYCLE MACHINE

BACKGROUND

The disclosed subject matter relates to air cycle machines, and more particularly to sealing arrangements for air cycle machines.

Conventional aircraft environmental control systems (ECS) incorporate an air cycle machine (ACM) for cooling and dehumidifying air supplied to an aircraft cabin. An ACM may include a centrifugal compressor and a centrifugal turbine mounted for co-rotation on a shaft. Air bearings in the form of journal bearings and thrust bearings are typically used to support rotation of the shaft. The centrifugal compressor further compresses partially compressed air, such as bleed air received from a compressor of a gas turbine engine. The compressed air discharges to a downstream heat exchanger or other system before returning to the centrifugal turbine. The compressed air expands in the turbine to thereby drive the compressor. The air output from the turbine may be utilized as an air supply for a vehicle, such as the cabin of an aircraft. During start-up of an ACM, friction from thrust loading on the thrust bearings can create resistance in the rotating components of the ACM, thus, it is desirable to reduce and/or balance thrust loading.

SUMMARY

A two-wheel air cycle machine includes a tie rod defining an axis, a turbine mounted on the tie rod, and a compressor mounted on the tie rod and having a rotor portion and a disk portion with at least one aperture. The air cycle machine further includes a compressor inlet fluidly connecting the compressor and an inlet air source, at least one thrust bearing disposed between the turbine and the compressor, and a compressor end shaft coaxial with the tie rod and abutting the compressor disk portion. The compressor end shaft includes a radially-extending seal disk portion and an axially-extending shaft portion having at least one shaft aperture. The at least one disk aperture and the at least one shaft aperture are fluidly connected by a compressor disk cavity defined by a gap between the tie rod and the compressor disk portion. The at least one disk aperture, the compressor disk cavity, and the at least one shaft aperture at least partially define a compressor inlet flow path.

Figure 1:
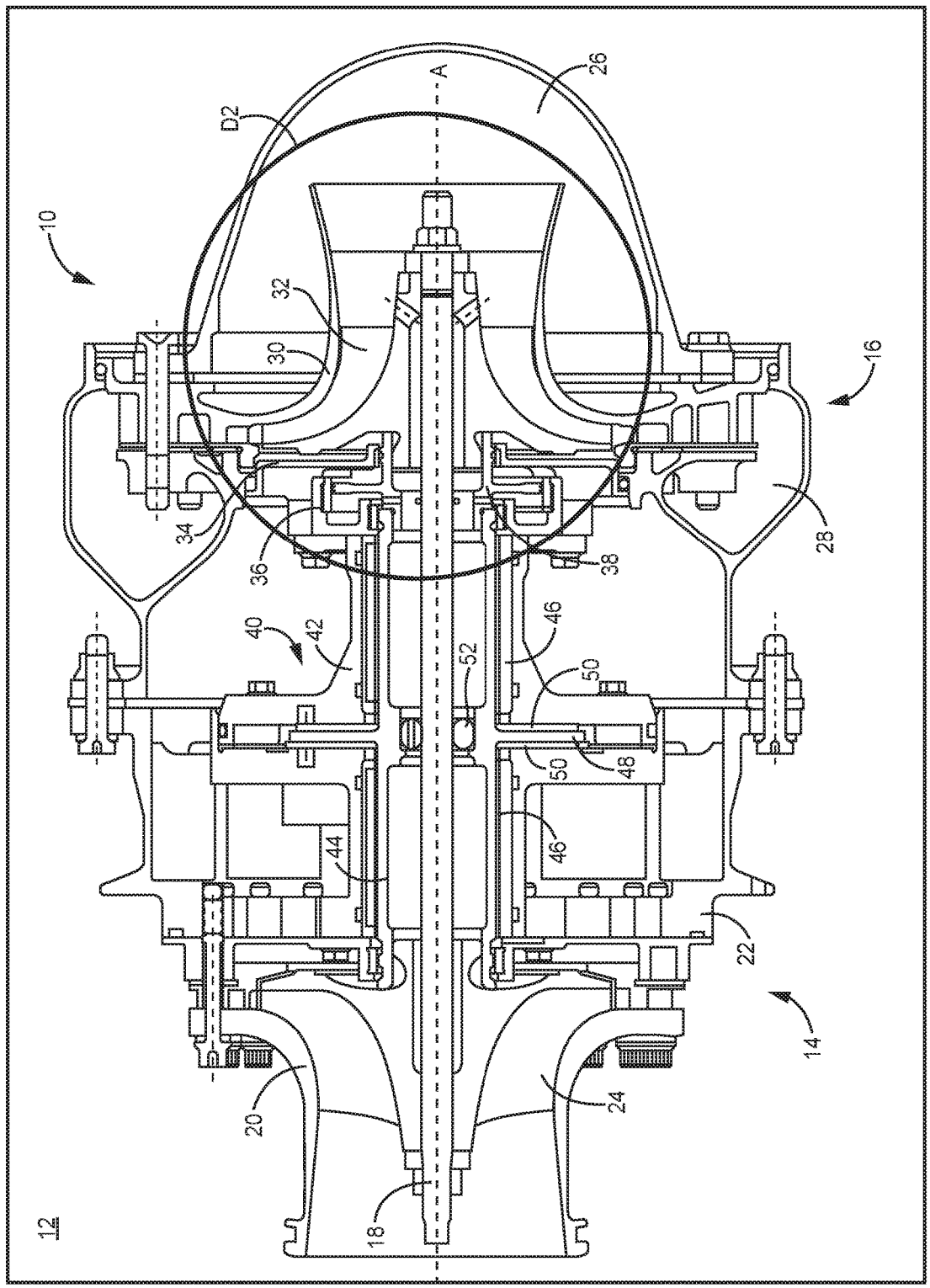
FIG. 1 is a cross-sectional view of a two-wheel air cycle machine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A two-wheel air cycle machine with a low pressure start design is disclosed herein. The air cycle machine includes a compressor end shaft with a radially-extending seal disk downstream of the compressor. The compressor end shaft and the compressor rotor disk define a generally balanced circumferential compressor inlet flow path along which air fed to the compressor inlet can flow. The combination of the seal disk and balanced inlet flow help maintain adequate start up pressure and a balanced thrust load on the bearings of the air cycle machine.

FIG. 1 is a cross-sectional view of air cycle machine 10, which can be incorporated into environmental control system 12 (represented schematically). Air cycle machine 10 has a two-wheel configuration such that it includes turbine section 14 and compressor section 16 mounted on and linked by tie rod 18. Turbine section 14 includes turbine shroud 20, turbine housing 22, and turbine rotor 24 rotatable about axis A/tie rod 18. Compressor section 16 includes compressor inlet 26, compressor outlet 28, compressor shroud/diffuser 30, compressor rotor 32 rotatable about axis A/tie rod 18, compressor seal plate 34, compressor seal housing 36, and compressor end shaft 38. Compressor inlet 26 receives air from an air source (not shown), and the air is compressed by compressor rotor 32. Some of the compressed air can be delivered to compressor outlet 28 and passed along to a separate air supply system, while a remainder of the compressed air is delivered to turbine section 14.

FIG. 1 further shows bearing system 40 disposed between turbine section 14 and compressor section 16. Bearing system 40 generally supports the rotation of tie rod 18 and includes bearing housing 42, bearing shaft 44, journal bearings 46, thrust disk 48, thrust bearings 50 positioned on each side of thrust disk 48, and tie rod support member 52. Thrust disk 48 extends radially outward from bearing shaft 44 to counter axial loads from rotors 24, 32 during operation of air cycle machine 10. In the embodiment shown, journal bearings 46 and thrust bearings 50 are hydrodynamic fluid bearings. Other suitable bearing types are contemplated herein. As can be seen in FIG. 1, bearing shaft 44 abuts compressor end shaft 32 at an end nearest the compressor, and abuts turbine rotor 24 at an opposite end. Bearing shaft 44 is coaxial with each of tie rod 18 and journal bearings 46, and is disposed concentrically within journal bearings 46. Tie rod support member 52 is coaxial with tie rod 18 and is axially aligned with thrust disk 48. Bearing shaft can be formed from a corrosion-resistant metallic material, such as stainless steel.

Figure 2:
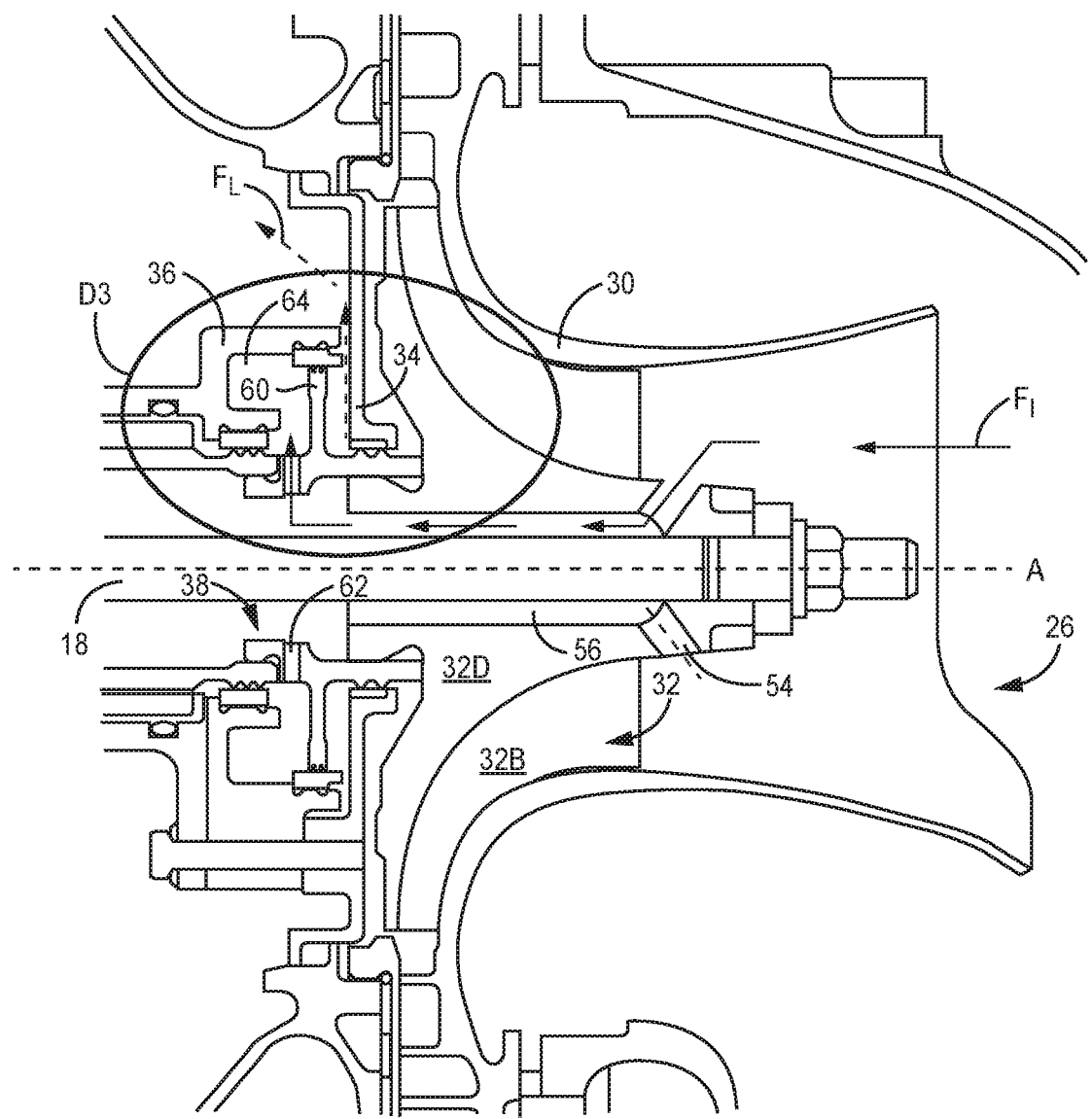
FIG. 2 is an enlarged cross-sectional view of the compressor section of the air cycle machine.

FIG. 2 is an enlarged cross-sectional view of detail D2 of FIG. 1 showing various elements of compressor section 16 in greater detail. Compressor rotor 32 includes a disk portion $32_D$ and blades $32_B$. Compressor rotor 32 can be formed from a metallic material, such as titanium. A plurality of disk apertures 54 extend through disk portion $32_D$ near compressor inlet 26. Apertures 54 can be evenly circumferentially distributed around disk portion $32_D$. Apertures 54 fluidly connect compressor inlet 26 and disk cavity 56 defined by a gap between disk portion $32_D$ and tie rod 18. In the embodiment shown, the gap defining cavity 56 is a continuous, annular gap such that disk cavity 56 is also a continuous, annular structure. In alternative embodiments, though, there can be an individual disk cavity 56 associated with each aperture 54.

Compressor end shaft 38 abuts disk portion $32_D$ on a side opposite compressor inlet 26. Compressor end shaft 38 can be formed from a corrosion-resistant metallic material, such as stainless steel. Compressor end shaft 38 includes axially-extending shaft portion 58, and radially-extending seal disk portion 60. Compressor end shaft 38 includes a plurality of shaft apertures 62 extending radially through shaft portion 58. Although shown in FIG. 2 as radially-extending apertures, shaft apertures 62 can be angled in alternative embodiments. Shaft apertures 62 can be evenly circumferentially distributed around shaft portion 58 of compressor end shaft 38. Shaft apertures 62 fluidly connect disk cavity 56 and seal cavity 64, which is partially defined by seal housing 36 and compressor end shaft 38. Seal plate 34 is coaxial with and extends radially away from compressor end shaft 38, and is positioned axially between compressor rotor 32 and seal housing 36. Seal plate 34 abuts a knife edge region 66 (labeled in FIG. 3) on shaft portion 58 of compressor end shaft 38. Like compressor end shaft 38, seal plate 34 can be made from a corrosion-resistant stainless steel or other suitable corrosion-resistant material. As shown in FIG. 2, seal plate 34 has a greater radial extent (from axis A) than either of seal housing 36 or seal disk portion 60 of compressor end shaft 38. In operation of air cycle machine 10, any seal leakage airflow $F_L$ (indicated by dashed arrows in FIG. 2) can pass between seal plate 34 and seal disk portion 60, and flow generally into the space surrounding bearing system 40.

Figure 3:
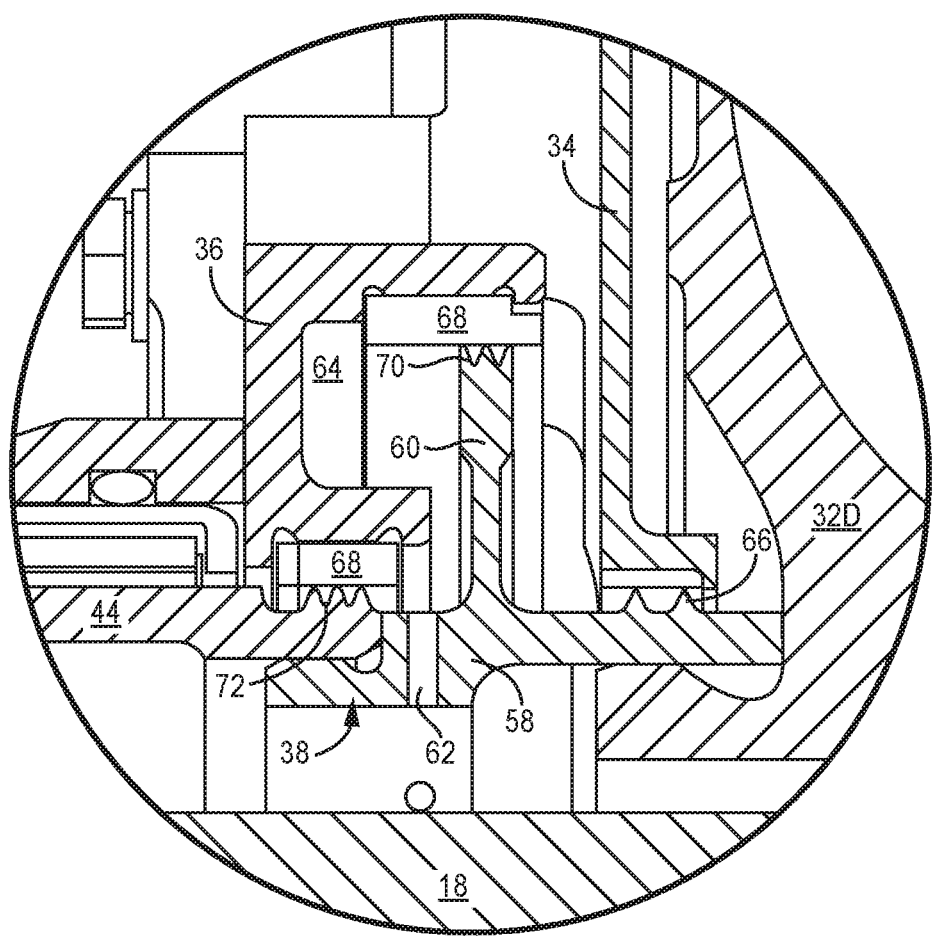
FIG. 3 is an enlarged cross-sectional view of a portion of a seal plate, compressor end shaft, and seal housing of the air cycle machine.

FIG. 3 is an enlarged cross-sectional view of detail D3 of FIG. 2 showing elements of compressor end shaft 38 and seal housing 36 in greater detail. Seal housing 36 supports abradable seals 68, which can be made from a polyimide or other suitable abradable material. One of the abradable seals 68 interacts with knife edge region 70 on seal disk 60. Another, more radially inward abradable seal 68 interacts with knife edge region 72 on bearing shaft 44. Seal housing can be formed from a metallic material, such as aluminum. The combination of seal disk portion 60, seal housing 36, and abradable seals 68 creates an enclosed, annular seal cavity 64.

Referring to FIGS. 2 and 3, the arrangement of apertures 54, 62 and cavities 56, 64 allows can optimize pressure and thrust loading at start-up and subsequent operations. With regard to thrust loading, a portion of compressor inlet 26 airflow Fi (indicated by solid arrows in FIG. 2) serially flows though disk aperture 54, disk cavity 56, shaft aperture 62 and seal cavity 64. A representative airflow path is shown in FIG. 2 on only one side of axis A for simplicity, although, it should be understood that such airflow can be circumferentially balanced about the axis to provide balanced airflow and thrust loading. Airflow entering seal cavity 64 can be vented back to compressor inlet 26 through ducting or other means, which further allows for balanced thrust loading on thrust bearings 50, as a portion of the compressor inlet airflow is being fed back to the compressor inlet side of air cycle machine 10. The total area of the flow path due to number and size of the apertures and cavities can also be selected to maximize pressure to allow for low pressure start-up. The various sealing features (i.e., seal disk 60, seal plate 34, seal housing 36, and abradable seals 68) also contribute to low pressure start-up as they cooperate to maintain adequate and balanced pressure during operation of air cycle machine 10.

The disclosed two-wheel air cycle machine has several benefits. Due to the inclusion of compressor end shaft 38 and associated sealing/venting features allows for adequate operating pressurization without the use of a diaphragm valve. Further, the centering of the thrust bearings between the compressor and turbine allows for the air cycle machine to maintain the same overall dimensions as previous models while including the compressor end shaft. In this manner, the disclosed air cycle machine can be used in place of existing models without requiring modification of surrounding componentry.

Discussion of Possible Embodiments

The following are non-exclusive descriptions of possible embodiments of the present invention.

A two-wheel air cycle machine includes a tie rod defining an axis, a turbine mounted on the tie rod, and a compressor mounted on the tie rod and having a rotor portion and a disk portion with at least one aperture. The air cycle machine further includes a compressor inlet fluidly connecting the compressor and an inlet air source, at least one thrust bearing disposed between the turbine and the compressor, and a compressor end shaft coaxial with the tie rod and abutting the compressor disk portion. The compressor end shaft includes a radially-extending seal disk portion and an axially-extending shaft portion having at least one shaft aperture. The at least one disk aperture and the at least one shaft aperture are fluidly connected by a compressor disk cavity defined by a gap between the tie rod and the compressor disk portion. The at least one disk aperture, the compressor disk cavity, and the at least one shaft aperture at least partially define a compressor inlet flow path.

The air cycle machine of the preceding paragraph can optionally include, additionally and/or alternatively, any one or more of the following features, configurations and/or additional components:

In the above air cycle machine, the seal disk portion can be a circumferentially continuous structure.

In any of the above air cycle machines, a radially outermost edge of the seal disk portion can include a knife edge.

In any of the above air cycle machines, the sealing structure can further include a seal housing coaxial with the compressor end shaft.

Any of the above air cycle machines can further include a seal plate supported by the seal housing and configured to contact the knife edge of the seal disk portion.

In any of the above air cycle machines, the seal disk portion and the seal housing can partially define an annular seal cavity.

In any of the above air cycle machines, the at least one shaft aperture can be a radially-extending aperture fluidly connecting the disk cavity and the seal cavity.

In any of the above air cycle machines, the seal cavity can be vented to the compressor inlet through ducting.

In any of the above air cycle machines, the at least one disk aperture can include a plurality of disk apertures distributed circumferentially about the axis.

In any of the above air cycle machines, the at least one shaft aperture can include a plurality of shaft apertures distributed circumferentially about the axis.

In any of the above air cycle machines, the at least one shaft aperture can be downstream of the seal disk portion with respect to the compressor inlet airflow path.

Any of the above air cycle machines can further include a first journal bearing disposed between the compressor and the at least one thrust bearing, and a second journal bearing disposed between the turbine and the at least one thrust bearing.

Any of the above air cycle machines can further include a bearing shaft coaxial with and supported by the first journal bearing and the second journal bearing.

In any of the above air cycle machines, a first end of the bearing shaft can abut the compressor end shaft.

In any of the above air cycle machines, the first journal bearing and second journal bearing can be hydrodynamic fluid bearings.

In any of the above air cycle machines, the at least one thrust bearing can include a first thrust bearing and a second thrust bearing, each being disposed on either side of a thrust runner.

In any of the above air cycle machines, the first thrust bearing and the second thrust bearing can be hydrodynamic fluid bearings.

In any of the above air cycle machines, the compressor end shaft can be formed from a corrosion-resistant metallic material.

In any of the above air cycle machines, the air cycle machine does not include a diaphragm valve.

In any of the above air cycle machines, the compressor inlet flow path can be symmetrical about the axis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A two-wheel air cycle machine comprising:
   a tie rod defining an axis;
   a turbine mounted on the tie rod;
   a compressor mounted on the tie rod, the compressor comprising a rotor portion and a disk portion having at least one disk aperture;
   a compressor inlet fluidly connecting the compressor and an inlet air source;
   at least one thrust bearing disposed between the turbine and the compressor; and
   a compressor end shaft coaxial with the tie rod and abutting the compressor disk portion, the compressor end shaft comprising a radially-extending seal disk portion and an axially-extending shaft portion, the axially extending shaft portion having at least one shaft aperture;
   wherein the at least one disk aperture and the at least one shaft aperture are fluidly connected by a compressor disk cavity defined by a gap between the tie rod and the compressor disk portion; and
   wherein the at least one disk aperture, the compressor disk cavity, and the at least one shaft aperture at least partially define a compressor inlet flow path.

2. The air cycle machine of claim 1, wherein the seal disk portion is a circumferentially continuous structure.

3. The air cycle machine of claim 1, wherein a radially outermost edge of the seal disk portion comprises a knife edge.

4. The air cycle machine of claim 3, further comprising: a seal housing coaxial with the compressor end shaft.

5. The air cycle machine of claim 4 and further comprising:
   a seal plate supported by the seal housing and configured to contact the knife edge of the seal disk portion.

6. The air cycle machine of claim 4, wherein the seal disk portion and the seal housing partially define an annular seal cavity.

7. The air cycle machine of claim 6, wherein the at least one shaft aperture is a radially-extending aperture fluidly connecting the disk cavity and the seal cavity.

8. The air cycle machine of claim 6, wherein the seal cavity is vented to the compressor inlet through ducting.

9. The air cycle machine of claim 1, wherein the at least one disk aperture comprises a plurality of disk apertures distributed circumferentially about the axis.

10. The air cycle machine of claim 1, wherein the at least one shaft aperture comprises a plurality of shaft apertures distributed circumferentially about the axis.

11. The air cycle machine of claim 1, wherein the at least one shaft aperture is downstream of the seal disk portion with respect to the compressor inlet airflow path.

12. The air cycle machine of claim 1 and further comprising:
   a first journal bearing disposed between the compressor and the at least one thrust bearing; and
   a second journal bearing disposed between the turbine and the at least one thrust bearing.

13. The air cycle machine of claim 12 and further comprising:
   a bearing shaft coaxial with and supported by the first journal bearing and the second journal bearing.

14. The air cycle machine of claim 13, wherein a first end of the bearing shaft abuts the compressor end shaft.

15. The air cycle machine of claim 12, wherein the first journal bearing and second journal bearing are hydrodynamic fluid bearings.

16. The air cycle machine of claim 1, wherein the at least one thrust bearing comprises:
   a first thrust bearing and a second thrust bearing, each being disposed on either side of a thrust runner.

17. The air cycle machine of claim 16, wherein the first thrust bearing and the second thrust bearing are hydrodynamic fluid bearings.

18. The air cycle machine of claim 1, wherein the compressor end shaft is formed from a corrosion-resistant metallic material.

19. The air cycle machine of claim 1, wherein the air cycle machine does not include a diaphragm valve.

20. The air cycle machine of claim 1, wherein the compressor inlet flow path is symmetrical about the axis.

* * * * *